United States Patent [19]

Ishihara

[11] 4,145,086
[45] Mar. 20, 1979

[54] METHOD AND MACHINE FOR DIGGING DITCH

[76] Inventor: Masamitsu Ishihara, 628 Hirai, Kannami-cho, Tagata-gun, Shizuoka-ken, Japan

[21] Appl. No.: 768,495

[22] Filed: Feb. 14, 1977

[30] Foreign Application Priority Data

Feb. 14, 1976 [JP] Japan .................................. 51-15355
May 11, 1976 [JP] Japan .................................. 51-52824

[51] Int. Cl.² ............................................ E21C 25/52
[52] U.S. Cl. .......................................... 299/15; 125/3; 125/6; 299/37
[58] Field of Search .................. 299/10, 23, 28, 36, 299/37, 40, 15

[56] References Cited

U.S. PATENT DOCUMENTS

| | | | |
|---|---|---|---|
| 157,546 | 12/1874 | Schaal | 299/28 X |
| 828,734 | 8/1906 | Gammie | 299/37 |
| 1,116,355 | 11/1914 | Morgan | 299/10 |
| 1,797,748 | 3/1931 | Alexander | 299/15 X |
| 2,689,117 | 9/1954 | Lindberg | 299/23 X |

Primary Examiner—Ernest R. Purser

[57] ABSTRACT

Disclosed is a method and machine for digging a ditch for use in, for example, duct disposition therein. In the floors and walls of a concrete structure, for example, three preparatory ditches or channels are dug by means of rotary blades. By inserting a breaking rod into a central one of the channels and causing it to vibrate substantially perpendicular to the channel to strike partition walls between the channels, the partition walls are readily broken or fractured, at which time the outermost channels serve as escapement spaces for permitting reception therein of the partition walls about to be bent or broken. Thereafter, the resultant partition wall pieces are removed, whereby a desired form of ditch is obtained. The partition wall fracturing steps may be carried out simultaneously with the channel digging or cutting step, or may alternatively be carried out independently after completion of the latter step.

11 Claims, 11 Drawing Figures

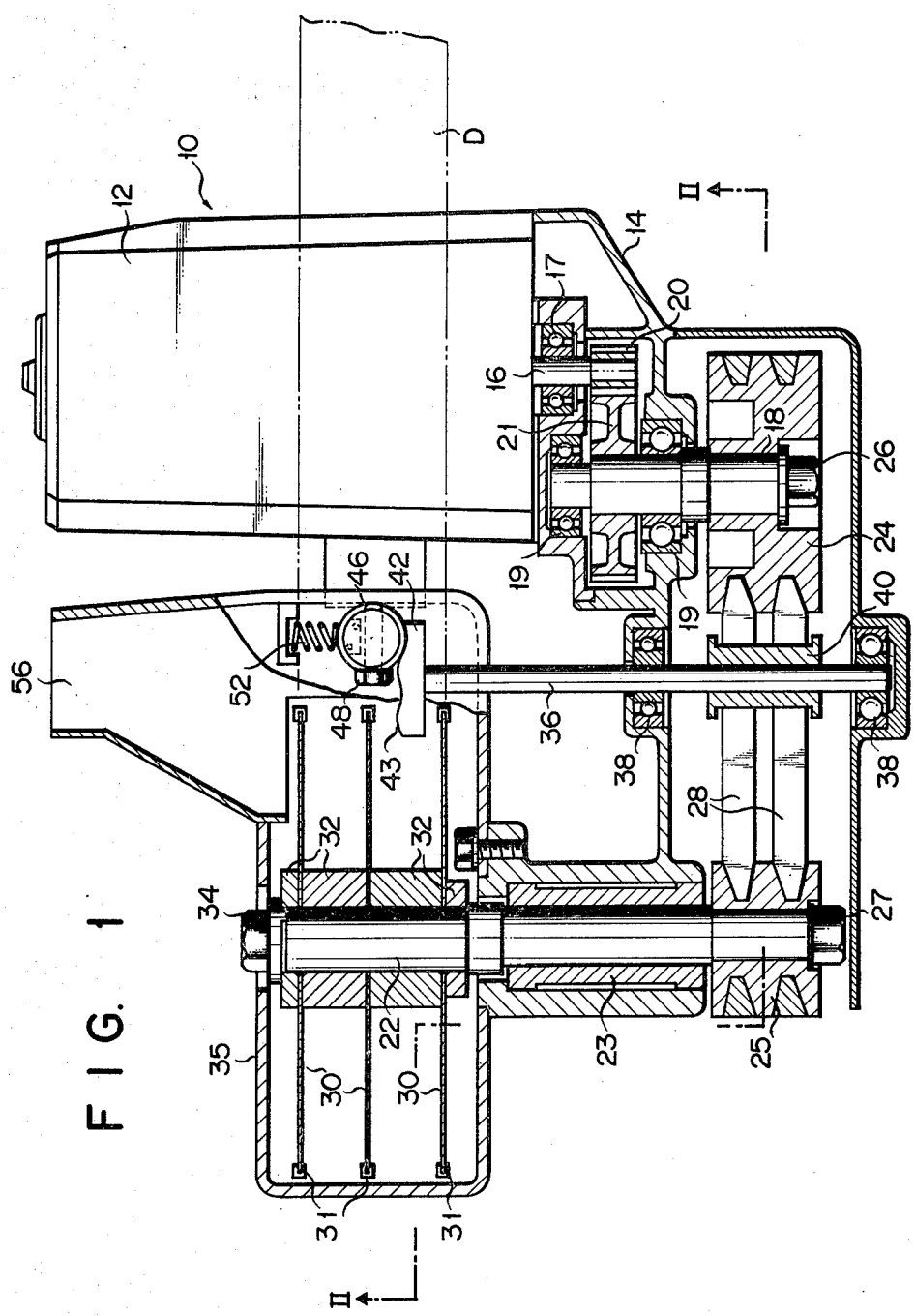

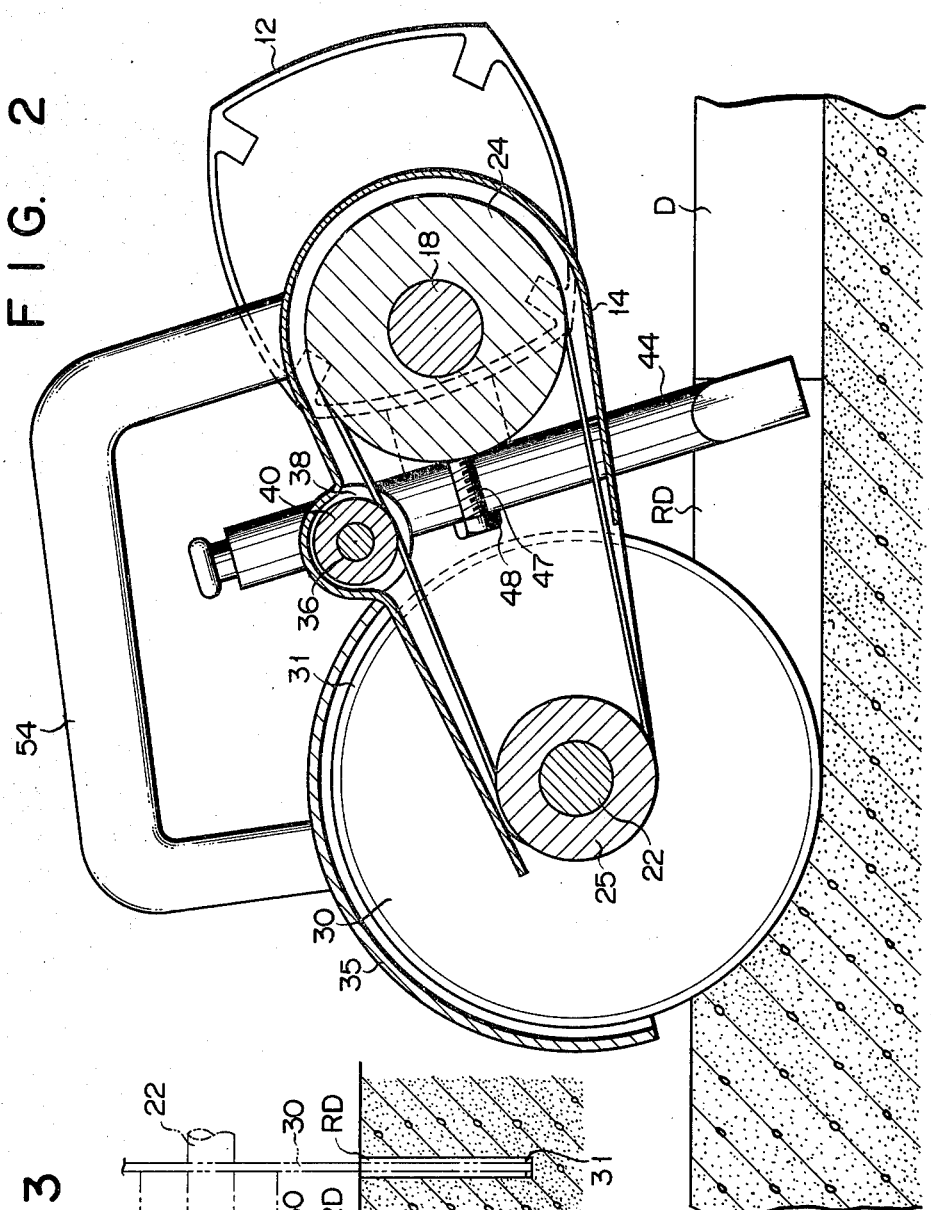
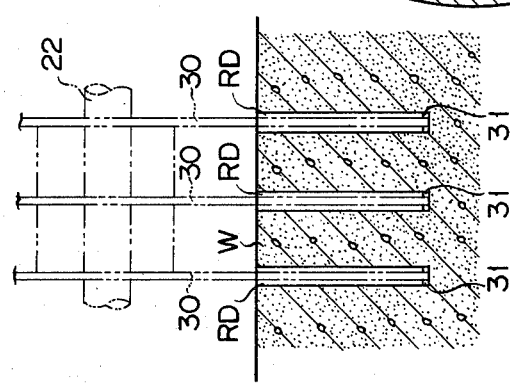

METHOD AND MACHINE FOR DIGGING DITCH

The present invention relates to a method and machine for digging a ditch with a desired width and depth in the surfaces of floor and wall made of hard structual material such as concrete, marble and the like.

There has been very frequently produced a necessity of digging a ditch in the surfaces of floor and wall made of hard structual material such as concrete, marble and the like already placed in position in order to lay electric conductors, gas and water pipes. So far such a ditch has been cut generally with manual tools such as chisels and hammers so that the ditch cutting operations are very hard, tedious works and inefficient and result in dimensional inaccuracies leaving rough side walls and bottom. To overcome these problems, there has been also employed a method wherein auxiliary ditches, for example, channels are previously cut along the outer profile lines of a ditch to be cut and thereafter a body left between the channels is removed with manual tools. However, this method assures only the smooth side walls, but leaves the rough surfaced bottom so that the results are not little so different from those attained by the former method.

Further, as above described, conventionally, manual tools such as chisels and hammers, or rotary cutters are known as ditching machines. But with any of these known ditching machines, a ditch fail to be formed with high efficiency so as to have a desired degree of cut surface smoothness.

One of the objects of the present invention is therefore to provide a ditching method for accurately and efficiently digging a ditch with a desired depth and width and with smooth walls and bottom.

Another object of the present invention is to provide a ditch cutting machine or ditching machine compact in size and light in weight and capable of accurately and efficiently cutting a ditch with a desired depth and width and with smooth walls and bottom.

According to one preferred embodiment of a ditching method of the present invention, three parallel channels are cut by three axially spaced rotary blades. The spacing between the outermost channels is, in general, substantially equal to a width of a ditch to be dug and the depth of the channels is substantially equal to a depth of a ditch to be dug. After the channels having been cut, a breaking or impact rod is inserted into the center channel and is forced to strike repeatedly two partition walls left between the three channels in a plane, for instance, perpendicular to the axis of the center channel. By so doing, the partition walls receive a bending moment due to the striking force acting thereon at which time the outermost channels serve as escapement spaces for permitting reception therein of the partition walls about to be bent or broken. As a consequence, the walls are readily sheared or fractured at their ends. When the broken partition walls are removed, there is provided a ditch with a desired depth and width. Since the side walls of the ditch are cut by the rotary blades, their surface are sufficiently smooth, and since the partition wall per se is sheared from the bottom in a plane substantially coplanar therewith and finely fractured pieces are produced only in a very small amount, the bottom is also satisfactorily smooth and the fractured partition walls and fine pieces may be easily removed.

The step for fracturing the partition walls with the breaking or impact rod in the manner described above may be carried out simultaneous with the channel cutting step or independently in time thereof.

According to one embodiment of a ditching machine of the present invention, three rotary blades are axially spaced apart from each other by suitable distances and rigidly supported on a driven shaft drivingly coupled to an output shaft powered by a prime mover mounted on a frame. The spacing between the outermost rotary blades is selected depending upon a width of a ditch to be dug. The rotary blades are rotated in unison with the driven shaft to cut auxiliary ditches or channels. A breaking or impact rod is mounted on the frame in such a way that it may swing in the plane substantially perpendicular to the axis of the center channel into which is inserted the breaking or impact rod. A cam which is powered by the prime mover is provided for forcing the breaking or impact rod to swing, striking against and exerting impact to two partition walls between the center channel and each of outer channels. The breaking or impact rod is extended downwardly beyond the frame and behind the center rotary blade so that it may be inserted into the center channel immediately after the latter has been cut and then be forced to swing to fracture the partition walls per se from their roots. Thus a ditch with desired dimensions may be very efficiently and accurately dug. The ditching machine in accordance with the present invention is compact in size, light in weight, easy to manoeuvre and portable.

The above and other objects and novel features of the present invention will more fully appear from the following detailed description when the same is read in connection with the accompanying drawings. It is to be expressly understood, however, that the drawings are for purpose of illustration only and is not intended as a definition of the limits of the invention.

FIG. 1 is a horizontal sectional view of a first preferred embodiment of the ditching mechaine of the present invention;

FIG. 2 is a sectional view taken along the line II—II of FIG. 1;

FIGS. 3, 4 and 5 are views used for the explanation of the mode of operation of the first embodiment;

FIG. 6 is a front view, partly in cross section, of a second preferred embodiment of the ditching machine of the present invention;

Same reference numerals are used to designate corresponding parts throughout the figures.

Figure 4:
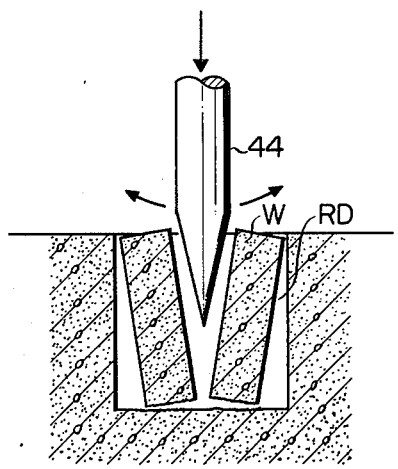

Referring to FIGS. 1 and 2, a ditching machine 10 comprises a frame 14 at the rear portion of which is mounted a prime mover or electric motor 12 with an output or driving shaft 16 supported by a ball bearing 17 on the frame and drivingly coupled through intermeshing reduction gears 20 and 21 to an intermediate shaft 18 supported by a pair of spaced ball bearings 19. A driven or main shaft 22 is supported in parallel with the output shaft 16 by a bearing metal 23 at the front portion of the frame 14. The intermediate and main shafts 18 and 22 are fixedly fitted with pulleys 24 and 25, respectively, by means of bolts 26 and 27, and two endless belts 28 whose cross section is trapezoidal are stretched in parallel between the pulleys.

A plurality or more than three, three in this embodiment, circular saws or blades 30, made of steel, with diamonds 31 sintered to the outer peripheries are rigidly supported on the main shaft 22 within a cover 35 and securely held in position with a nut 34 and axially spaced apart from each other by a suitable distance with spacers 32 interposed therebetween. The spacing between the outer rotary blades 30 is determined depending upon a width of a ditch to be dug. More specifically, to adjust the spacing, the rotary blades 30 together with the spacers 32 are removed from the main shaft 22 by loosening the nut 34, and are mounted again with spacers each having a suitable distance depending upon a width of a ditch to be dug. Alternatively, there may be prepared a plurality of rotary blade-spacer units or assemblies in each of which the rotary blades are spaced apart from each other by suitable distances with the spacers interposed therebetween, and depending upon a width of a ditch to be dug one of them may be suitably selected and supported on the main shaft 22.

A driven or auxiliary shaft 36 is disposed in parallel with the main shaft 22 between the latter and the intermediate shaft 18 and is supported by axially spaced ball bearings 38 on the frame 14 and carries at one end portion thereof a tension pulley 40 which is forcibly pressed against the V-belts 28 to keep them sufficiently tight. The auxiliary shaft 36 also carries at the other end thereof a cam member 42 with a cam surface 43 for vibrating or swinging a breaking or impact rod 44 to be described in detail hereinafter.

The breaking or impact rod 44 is disposed backwardly of the inner or center rotary blade 30, is vertically extended and pivotably mounted at a point intermediate thereof with a bolt 48 which is loosely fitted into a through hole 46 drilled through the breaking or impact rod at right angles to the axis thereof and is screwed into an internally threaded hole (not shown) of the frame 14. The axis of the pivot or bolt 48 lies in the same plane with the inner rotary blade 30. The upper end of the breaking or impact rod 44 which swings about the pivot or bolt 48 is normally pressed against the cam surface 43 of the cam member 42 under the force of biasing means such as a compression coil spring 52, whereas the lower end is extended downwardly beyond the frame 14 and terminated into a wedge with such downwardly tapered surfaces that the edge is in parallel with the rotary blades 30 when the breaking or impact rod 44 is in upright position.

Figure 5:
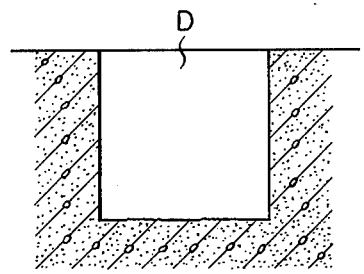
Figure 7:
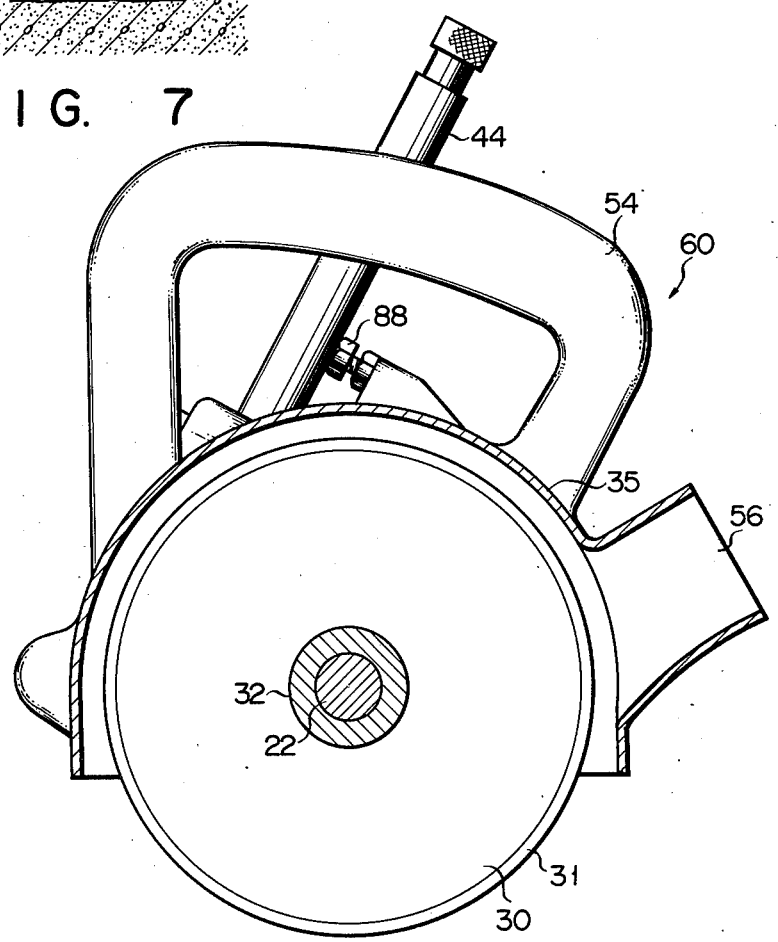
FIG. 7 is a sectional view taken along the line VII—VII of FIG. 6.

Next the mode of operation of the ditching machine 10 with the above construction will be described with further reference to FIGS. 3, 4 and 5. First, the spacers 32 are so set that the spacings between the three blades 30 may correspond to the width of a ditch to be dug. A depth of a ditch to be dug is determined by the adjustment of the height of a handle 54 (see FIG. 2) attached to the frame 14. Alternatively, the depth may be controlled by the adjustment of the height of a carriage arm (not shown) which is placed on the surface to be dug and carries the frame 14. Upon rotation of the electric motor 12, torque is transmitted from the output shaft 16 through the reduction gears 20 and 21 to the intermediate shaft 18, from which the torque is transmitted through the two-V-belt to the main shaft 22 and the auxiliary shaft 36. Upon rotation of the main shaft 22, the three rotary blades 30 rotate in unison. An operator holds the handle 54 in such a way that the rotary blades 30 are gradually brought into contact with a surface of floor, and then the operator gradually advances the digging machine 10 in the direction at a right angle to the axis of the main shaft 22 to dig three parallel channels or reserve ditchs RD to a suitable depth as shown in FIG. 3.

The auxiliary shaft 36 is rotated in the same direction as the main shaft 22 through the tension pulley 40 which is firmly pressed against the V-belts 28 so that the cam member 42 is rotated and consequently the breaking or impact rod 44 with the upper end portion pressed against the cam surface 43 is caused to swing about the pivot or bolt 48 in the direction substantially perpendicular to the axis of the center channel. As a consequence when the breaking rod 44 is inserted into the center channel as shown in FIG. 4 and is forced to swing in the directions indicated by arrows, striking alternately against two partition walls w of the center channel so that they per se are fractured at their roots as shown in FIG. 4. If there were no outer channels RD, it would be next to impossible to enlarge the center channel, but the outer channels permit the lateral deflection of the partition walls, so that these partition walls receive a bending moment by being struck and are integrally broken at their bases substantially as they originally stand. When pieces of the broken partition walls are removed, a ditch D with a desired width and depth is dug as shown in FIG. 5.

As described above, in the digging machine 10 in accordance with the present invention, first three channels RD with a predetermined width and a predetermined depth are cut, and then the breaking rod is inserted into the center channel and repeatedly swung to break or fracture the partition walls between the outer and center channels at the roots of the partition walls. Therefore, if the width of the outer channels is selected depending upon the width of the ditch to be dug, a desired ditch can be obtained by removal of the broken partition wall pieces. The ditch thus dug has smooth side walls and bottom because, as described above, the walls per se are fractured or torn at their roots.

With the digging machine in accordance with the present invention, the three rotary blades or saws carried by the main shaft cut the three parallel channels, and the breaking or impact rod which has its midpoint pivoted to the frame is inserted into the center channel and is forced to swing to give fracture impact to the partition walls by the cam member carried by the auxiliary shaft which rotates simultaneous with the main shaft, so that the partition walls are fractured at their roots because of the excessive bending moment produced by the impact.

With the digging machine in accordance with the present invention, the channels with desired dimensions may be dug in any direction accurately and efficiently so that the operator feels less fatigue and the desired channel may be accomplished within a relatively short time.

It should be noted that at least three rotary blades must be provided in order to cut a central channel and two outermost channels and that depending upon a width of a ditch to be dug the number of rotary blades used must be increased or decreased suitably. The striking or impacting force being applied to the partition walls is not limited to a one applied thereto by the swinging operation of the breaking or impact rod, but may be applied by, for example, vertical reciprocation thereof. Further, the swinging operation of the breaking rod is not limited to a one performed substantially perpendicular to the axis of the center channel, but may be carried out in any planes not perpendicular thereto.

According to the digging machine of the present invention, the partition walls are fractured at their roots, but are not wholly broken to pieces so that only a very small amount of concrete dust or pieces is produced and spread. However, the present invention further provides an exhaust hole 56 which may be communicated to a suction port of any suitable dust collector (not shown) so that the air contamination problem may be eliminated.

The second preferred embodiment shown in FIGS. 6 through 9 is similar in construction to the first preferred embodiment described above in conjunction with FIGS. 1 and 2 except that the breaking or impart rod 44 is received in a holder so as to be extended therefrom at a position located sidewardly of the rotary blade.

The torque produced by the electric motor 12 of a digging machine 60 is transmitted from the output shaft 16 through the reduction gears 20 and 21 to the main shaft 22 directly, that is, not through the two-V-belts. A rod or cam follower 68 which is slidably fitted into a radial through hole 66 of the frame 14 is made into contact with a cam surface 64 formed on the side or peripheral surface of a cam member 62 formed integral with the main shaft 22.

Figure 8:
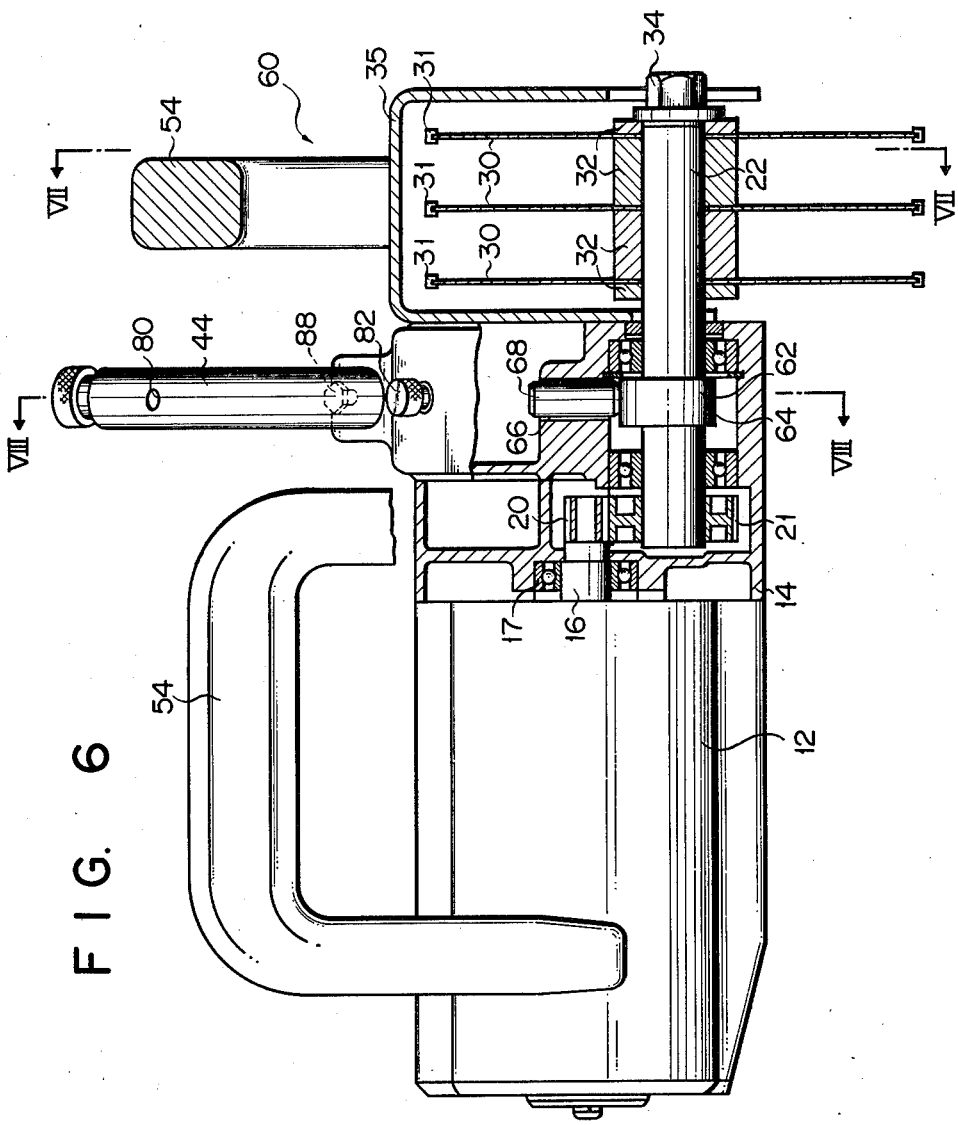
FIG. 8 is a sectional view taken along the line VIII—VIII of FIG. 6 illustrating a breaking or impact rod in retracted or inoperative position.

The breaking or impact rod 44 is received in a holder 70 so as to be extended downwardly at a position located sidewardly of the rotary blade substantially perpendicular to the axis thereof, which is disposed in axially spaced relation with the rotary blades and is pivoted to the frame 14 with a pivot pin 72 which is in parallel with the main shaft 22 and at the opposite side of the rod 68 as best shown in FIG. 8. The holder 70 is normally pressed against the rod 68 under the biasing force of a compression coil spring 74 loaded between the frame 14 and the holder 70. An adjusting bolt 76 is provided to adjust the biasing force of the spring 74 exerted to the holder 70. A replacement of the spring 74 may be made by loosening and removing the adjusting bolt 76. Upon rotation of the cam member 62 together with the main shaft 22, the rod or cam follower 68 which is made into contact with the cam surface 64 is caused to reciprocate in the hole 66 so that the holder 70 is caused to swing about the pivot pin 72 against the bias force of the spring 74. The breaking rod 44 is formed with an annular engaging groove 78 spaced apart by a suitable distance from the lower end or edge of the wedge of the breaking or impact rod and two engaging holes or recesses 80 in the side surface adjacent to the upper end and equiangularly of, that is, on the same sides of the tapered or wedge surfaces of the wedge of the breaking rod. A stopper 82 with a tapered end is slidably received by the frame 14 for selective engagement with either the annular engaging groove 78 or the engaging hole or recess 80. A compression coil spring 86 is loaded between the head of the stopper 82 and a snap ring 82 fitted over the stopper so as to ensure the secure engagement thereof with the annular engaging groove 78 or engaging recess 80.

In order to prevent the swinging of the holder 70 with the breaking or impact rod 44 in the retracted inoperative position shown in FIG. 8 even when the cam follower 68 is extended, a lifter or stopper 88 in the form of a bolt is attached to the frame 14 and is made into contact with the breaking rod 44 so that the holder 70 is rotated against the spring 76 through a very small angle in the counterclockwise direction and is not made into contact with the upper end of a stroke of the cam follower 68. As a result the reciprocating motion of the cam follower 68 is not transmitted to the holder 70 so that the latter will not be caused to swing about the pin 72. Instead of the bolt-like lifter or stopper 88, a lever-like retaining member may be used.

Next the mode of operation of the second embodiment with the above construction will be described. The spacings between the rotary blades 30 are selected with suitable spacers 32 depending upon the width of the ditch to be dug. The breaking rod 44 is retracted into the holder 70 and is securely locked in the inoperative position with the stopper 82 engaged with the annular engaging groove 78 and the lifter or stopper 88 made into contact with the retracted breaking rod 44 as shown in FIG. 8 so that the holder 70 may be moved away from the upper end of the stroke of the cam follower 68.

The electric motor 12 is energized and the digging machine 60 is advanced in a desired direction to cut three reserve ditchs or channels in a manner substantially to similar to that described in conjunction with the first embodiment. In channel cutting operation, the cam follower 68 reciprocates as the cam member 62 rotates together with the main shaft 22, but, as described above, the holder 70 is displaced by the lifter 88 away from the upper stroke end of the cam follower 68 so that the holder 70 and hence the breaking rod 44 will not swing.

Figure 9:
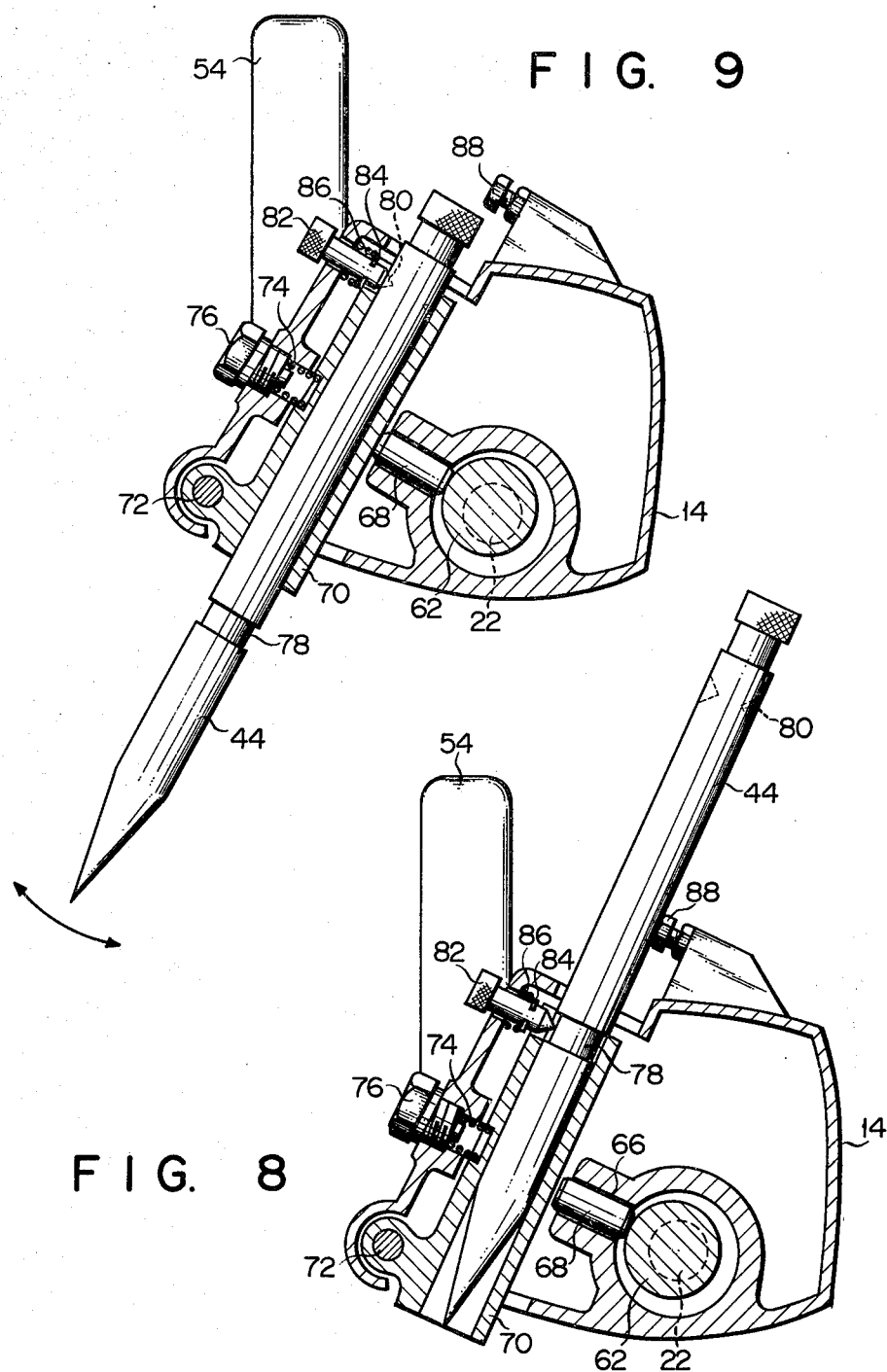
FIG. 9 is a view similar to FIG. 8 illustrating the breaking or impact rod in extended or operative position.

After the channels have been cut, the operator pulls the stopper 82 against the spring 86 to release it away from the annular engaging groove 78 so that the breaking rod 44 is extended downwardly from the holder 70 until the stopper 82 firmly engages with the engaging hole or recess 80 as shown in FIG. 9, whereby the breaking rod 44 may be securely held in the operative position. Because of the recess 80 having a configuration in conformity with the wedge-shaped tip end of the stopper 82, the rotation of the breaking rod 44 is prevented, and because the breaking rod is moved away from the lifter 88, the biasing force of the spring 74 is now freely exerted to the holder 70 so that the latter swings about the pivot pin 72 as the cam follower 68 reciprocates. Then the operator changes the direction of the digging machine 60 by about 90° and inserts the breaking rod 44 into the center channel to fracture the partition walls in the same manner as described in conjunction with the first embodiment. With the breaking rod 44 in the operative position, the rotary blades 30 are moved in contact with the surface of the floor.

One of the important features of the second embodiment resides in the fact that the step for cutting channels and the step for fracturing the partition walls between the channels cut may be carried out independently of each other. The first embodiment shown in FIGS. 1 and 2 accomplishes the channel digging and partition wall fracturing simultaneously so that a large-sized electric motor with a high power must be used, but in the second embodiment a small-sized, low power output motor may be used so that the digging machine may be made compact in size and light in weight. Furthermore because the breaking rod 44 will not swing during the channel cutting operation, it is easier for the operator to manoeuvre the digging machine so that the channels may be easily cut straightly and accurately.

The highest channel cutting efficiency may be attained when the spacing between the outermost rotary blades is selected substantially equal to the width of a ditch to be dug, but depending upon the hardness of an object through which channels are cut, the spacing may be set to be narrower than the width of a ditch to be dug. When a wider ditch is to be dug, the number of rotary blades may be increased or the channel cutting operations may be repeated until the ditch with a desired width is obtained.

Figure 10:
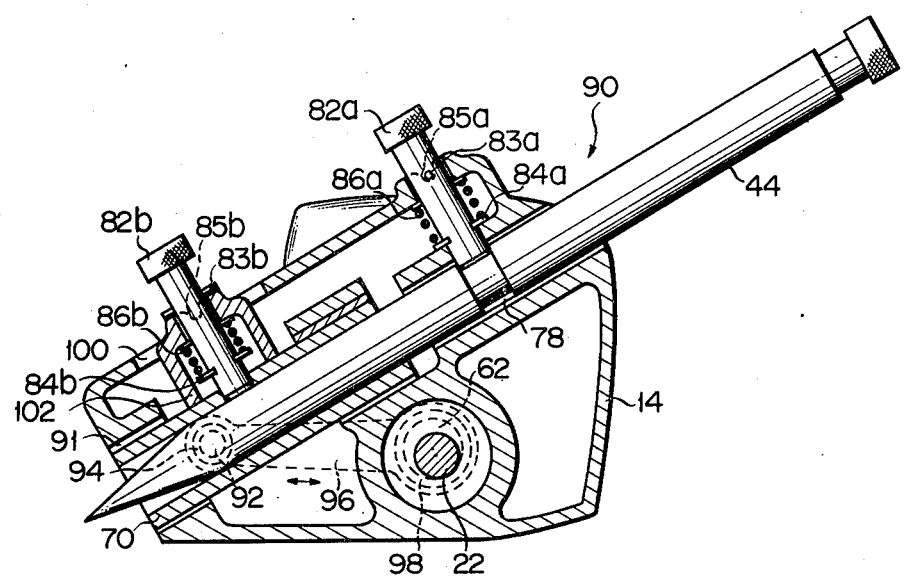
FIG. 10 is a view similar to FIG. 8 but illustrating a third preferred embodiment of the ditching machine of the present invention with the breaking or impact rod retracted or inoperative position.
Figure 11:
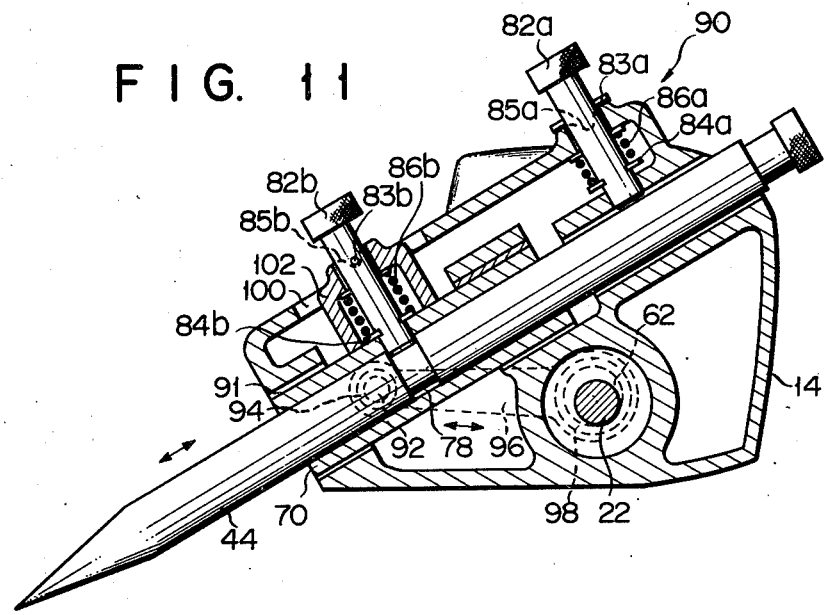
FIG. 11 is a view similar to FIG. 10 but illustrating the breaking or impact rod in extended or operative position.

The digging machine 90 of the third preferred embodiment according to this invention shown in FIGS. 10 and 11 is different from the first and second preferred embodiments described above in that the breaking rod 44 is vertically reciprocated.

On the outer periphery of the holder 70 of the breaking rod 44 is fixedly provided a pivot pin 92, to which a crank 96 is connected at one end through a ball-bearing 94. The holder 70 is slidably fitted to the frame 14 through a bushing 91. The crank 96 is connected at the other end to a cam member 62 formed integrally with the main shaft 22.

Where the breaking rod 44 is rendered inoperative, that is to say, where channels are cut or dug with the rotary blades 30, the breaking rod 44 must be locked to an inoperative position by retracting the break rod 44 upwards and thereafter inserting stopper 82a into the engaging hole 78. The wall portion of the frame 14, which is bored with an attachment hole for the stopper 82a, is formed with a groove 85a engageable with an engaging or retaining pin 83a extended through the stopper 82a. Accordingly, if the engaging pin 83a is engaged with the groove 85a, the stopper 82a will be inserted into the engaging hole 78 by means of a compression coil spring 86a pressed against a snap ring 84c.

A carrier 102 is disposed in an elongated hole 100 bored in the frame 14 so as to be slidably moved through the hole 100. This carrier 102 is attached with another stopper 82b, which is also fitted with an engaging pin 83b. The wall portion of the carrier 102, which is bored with an attachment hole for the stopper 82b, is formed with a groove 85b engageable with the engaging pin 83b. Where the breaking rod 44 is locked to the inoperative position, the pin 83b, as shown in FIG. 10, is allowed to abut against the shoulder of the stopper 83a and not engaged with the groove 85b. When the machine frame 14 is placed in a position as shown in FIG. 10, the rotational force of the main shaft 22 is transmitted to the crank 96 through the cam member 62 and the bearing 98, but the crank 96 merely acts to cause the holder 70 and the carrier 102 to be moved slidably along the breaking rod 44.

When it is desired to cause the breaking rod 44 to make a reciprocating movement, the engaging pin 83a of the stopper 82a, as shown in FIG. 11, is caused to abut against the shoulder of the stopper 82a without being engaged with the groove 85a, while, on the other hand, the engaging pin 83b of the stopper 82b is engaged with the groove 85b and the stopper 82b per se is inserted into the engaging hole 78 of the breaking rod 44. In this case, the breaking rod 44 connected to the holder 70 through the stopper 82b, and as a result the crank 96 acts to cause the breaking rod to vertically slide through the holder, jointly with the holder 70, carrier 102 and stopper 82b. Thus, when the breaking rod 44 is inserted into the center channel and is vertically reciprocated to give a repetitive impact to the partition walls, the latter are fractured at the roots.

What is claimed is:

1. A method of digging a ditch comprising the steps of cutting in the surface to be dug more than three channels to make a partition wall therebetween, said channels being in parallel with each other and spaced apart from each other by a suitable distance,
   inserting a breaking rod into one of said channels except the outmost ones,
   repeatedly swinging the breaking rod about a pivot point in a direction substantially perpendicular to the axis of the channel, and
   alternately striking against two partition walls between the channels by means of the breaking rod, thereby fracturing the partition walls at the bases thereof.

2. A method according to claim 1 wherein the steps for cutting channels and fracturing the partition walls between the channels are simultaneously carried out.

3. A method according to claim 1, wherein the step for fracturing the partition walls is carried out independently in time of the step for digging channels.

4. A channeling machine comprising
   a frame,
   a prime mover mounted on the frame,
   a driven shaft supported in the frame for rotation by the prime mover,
   at least three rotary blades rigidly supported on the driven shaft and axially spaced apart from the adjacent rotary blades by a suitable distance, the rotary blades rotating together with the driven shaft for cutting channels,
   at least one breaking rod which is inserted into one of the channels except the outermost ones which is swung about a pivot point in a direction substantially perpendicular to the axis of said channel, and
   impact generating means for giving impact force through the breaking rod to the partition walls between the channels, thereby fracturing them at the base thereof.

5. A channelling machine according to claim 4 further comprising means for pivotably mounting the breaking rod to the frame, and wherein the impact generating means includes means for normally biasing the breaking rod in a plane substantially perpendicular to the axis of each of said channels cut, and means for intermittently transmitting impact force to the breaking rod against the biasing means.

6. A channelling machine according to claim 5, wherein the biasing means includes a compression coil spring, the impact force generating means includes a cam member driven by the prime mover, the breaking rod has its lower end terminated into a wedge, and each of the more than three rotary blades has diamond pieces sintered to the outer periphery thereof.

7. A channelling machine according to claim 6, wherein the breaking rod is formed with a radial through hole at a point intermediate between the ends thereof, is disposed rearwardly of one of the rotary blades excluding the outermost ones and is extended downwardly of the frame, the breaking rod mounting means includes a bolt loosely extended through the radial through hole and screwed into the frame, and the cam member is formed integral with an auxiliary driven shaft disposed for rotation in synchronism with the driven shaft, and is made into contact with the breaking rod.

8. A channelling machine according to claim 6, wherein the breaking rod is disposed in an axially spaced relationship with one of the outermost rotary blades, and the breaking rod mounting means includes a holder for holding the breaking rod so as to permit it to be extendable downwardly beyond the frame into an operative position, and a pivot pin for attaching the holder to the frame so as to permit the holder to be swingable about the pivot pin.

9. A channelling machine according to claim 8, wherein the breaking rod is formed with upper and lower engaging recesses which are axially spaced apart from each other by a suitable distance, the breaking rod mounting means further includes a stopper with its lower end so shaped as to match with the upper engaging recess, and the impact force generating means further includes a pushing rod for intermittently pushing the holder against the compression spring, thereby causing the holder and hence the breaking rod to swing about the pivot pin.

10. A channelling machine according to claim 9, wherein the breaking rod mounting means further includes lifter which, when the stopper is in engagement with the upper engaging recess, acts against the compression spring, so as to prevent the pushing rod from abutting against the holder.

11. A channelling machine according to claim 10, wherein the compression spring is so fitted to the frame that its biasing force may be suitably adjusted, and the stopper of the mounting means is retractably fitted to the frame.

* * * * *